US007677415B2

(12) United States Patent
Auer

(10) Patent No.: US 7,677,415 B2
(45) Date of Patent: Mar. 16, 2010

(54) PORTION-DELIVERING DISPENSER

(75) Inventor: Guenter Auer, Villingen-Schwenningen (DE)

(73) Assignee: MegaPlast GmbH (DE)

( * ) Notice: Subject to any disclaimer, the term of this patent is extended or adjusted under 35 U.S.C. 154(b) by 775 days.

(21) Appl. No.: 11/497,409

(22) Filed: Aug. 1, 2006

(65) Prior Publication Data

US 2007/0045347 A1 Mar. 1, 2007

(30) Foreign Application Priority Data

Aug. 1, 2005 (DE) .................. 20 2005 012 241 U
Dec. 10, 2005 (DE) .................. 20 2005 019 298 U

(51) Int. Cl.
*B65D 37/00* (2006.01)
*G01F 11/00* (2006.01)

(52) U.S. Cl. .................... 222/207; 222/321.7; 222/380; 222/256; 239/104; 239/333; 239/541; 239/455

(58) Field of Classification Search ................. 222/207, 222/256, 402.12, 380, 182, 321.3, 375, 321.7; 239/104, 333, 541, 455
See application file for complete search history.

(56) References Cited

U.S. PATENT DOCUMENTS

| | | | | |
|---|---|---|---|---|
| 2,678,147 | A * | 5/1954 | Abplanalp | 222/545 |
| 3,386,631 | A * | 6/1968 | Kotuby | 222/402.11 |
| 5,096,098 | A * | 3/1992 | Garcia | 222/402.13 |
| 5,238,156 | A * | 8/1993 | Andris | 222/207 |
| 5,306,125 | A * | 4/1994 | Weag | 417/472 |
| 5,664,703 | A * | 9/1997 | Reifenberger et al. | 222/207 |
| RE35,744 | E * | 3/1998 | Foster et al. | 239/333 |
| 5,819,990 | A * | 10/1998 | Cimentepe et al. | 222/207 |
| 6,209,760 | B1 * | 4/2001 | Fuchs | 222/321.6 |
| 6,299,036 | B1 * | 10/2001 | Fuchs | 222/509 |
| 6,805,267 | B2 * | 10/2004 | Bougamont | 222/633 |
| 6,966,465 | B2 * | 11/2005 | Kang | 222/321.9 |
| 7,048,155 | B2 * | 5/2006 | Kuwahara et al. | 222/321.9 |
| 2001/0025860 | A1 * | 10/2001 | Auer | 222/137 |
| 2004/0238572 | A1 * | 12/2004 | Blake | 222/207 |
| 2005/0017027 | A1 * | 1/2005 | Yerby et al. | 222/402.13 |
| 2005/0115990 | A1 * | 6/2005 | Kang | 222/321.9 |

FOREIGN PATENT DOCUMENTS

| | | | |
|---|---|---|---|
| DE | 102 22 375 | A1 | 5/2002 |
| EP | 0 214 106 | B1 | 7/1986 |
| EP | 1749582 | B1 | 1/2009 |
| JP | 56105772 | A | 8/1981 |
| WO | 02056725 | A1 | 7/2002 |

* cited by examiner

*Primary Examiner*—Kevin P Shaver
*Assistant Examiner*—Donnell Long
(74) *Attorney, Agent, or Firm*—St. Onge Steward Johnston & Reens LLC

(57) ABSTRACT

The invention relates to a dispenser for delivering portions of liquid to pasty substances, having a storage container and a pumping chamber, the pumping chamber having at least one valve, and having a delivery head which can be displaced relative to the storage container and the displacement of which allows the substance to be delivered, the delivery head further having formed in it a delivery channel with a delivery opening, which delivery opening can be closed by a closure part which is removable, but is held in captive fashion on the delivery head. In order to specify such a dispenser for delivering portions of liquid to pasty substances which is configured in an advantageous manner, in particular, in respect of a closure part, it is proposed that the closure part is a sliding part which also forms a delivery-channel portion and interacts with a fixed closure pin.

11 Claims, 9 Drawing Sheets

PORTION-DELIVERING DISPENSER

FIELD OF THE INVENTION

The invention relates to a dispenser for delivering portions of liquid to pasty substances, having a storage container and a pumping chamber, the pumping chamber having at least one valve, and having a delivery head which can be displaced relative to the storage container and the displacement of which allows the substance to be delivered, the delivery head further having formed in it a delivery channel with a delivery opening, which delivery opening can be closed by a closure part which is removable, but is held in captive fashion on the delivery head.

BACKGROUND OF THE INVENTION

A wide variety of different configurations of dispenser of the type in question are already known. Reference need merely be made, for example, to the disclosure content of EP 214 106 B1 or DE 102 22 375 A1.

Such dispensers have in common the fact that the closure part which is seated on the outside on the delivery opening executes a circular movement or, in any case, substantially a circular movement when it moves into the open position. A correspondingly reverse movement takes place when the delivery opening is closed. This is associated, in some cases, with the substances being sheared off.

Taking the above described prior art as the departure point, it is an object of the invention to specify such a dispenser for delivering portions of liquid to pasty substances which is configured in an advantageous manner, in particular, in respect of a closure part.

SUMMARY OF THE INVENTION

This object is achieved first and foremost by the subject matter of Claim 1, this being based on the fact that the closure part is also a sliding part which forms a delivery-channel portion and interacts with a fixed closure pin. Since a fixed closure pin is provided and the closure part is formed as a sliding part, the closure pin can function as a stopper by means of which the delivery opening, which is formed, for example, at the same time in the sliding part, is opened when the sliding part is correspondingly actuated in the direction away from the dispenser, so that the pasty substance, for example skin cream or the like, can be discharged in a strand-like manner via the delivery opening. This presupposes a corresponding substance pressure being present in the dispenser. Since the preferably round delivery opening has a reduced diameter in relation to the preferably round delivery-channel portion, discharge of the pasty substance in a strand-like manner is achieved in the open position of the sliding part. In the case of a corresponding reverse actuation of the sliding part in the direction toward the dispenser, the delivery opening moves over the end of the closure pin, in which case the latter penetrates into the delivery opening in a manner similar to a stopper and preferably terminates flush with the periphery of the delivery opening. In principle, the delivery opening is pushed onto the free end of the closure pin, the free end preferably being of a slightly conical formation in order to provide better functioning. The longitudinal cross-section of the delivery opening is adapted correspondingly in this respect. When the sliding part is actuated in the direction toward the dispenser, the substance located in the delivery-channel portion, which encloses the closure pin, is shifted toward the inside of the dispenser as a whole by way of the delivery-channel portion. The linear displacement path of the sliding part, which is in the range of a few millimeters, is oriented transversely to the vertical dispenser axis both in the open position, in which the sliding part is directed away from the dispenser, and in the closed position, in which the sliding part is directed toward the dispenser.

Such a dispenser is suitable for substances of different viscosities ranging from watery liquids to substances of extremely high viscosity.

The features below are explained in relation to the subject matter of the main configuration described, but, in principle, may also be important independently of this subject matter.

It is thus preferred if the sliding part can be actuated from the upper side of the delivery head. As a result, an actuating finger which is used for displacing the sliding part can also be used, at the same time, for pushing down the delivery head. This allows single-handed operation of the dispenser as a whole in practice. In an expedient configuration of the invention, it is provided that the sliding part has an upper-side sliding-action actuating portion which, in cross-section, extends at an angle to a skirt portion such that the inner surface of the skirt portion encloses an angle of less than 180° in relation to the sliding-action actuating portion. The angle of less than 180° which is enclosed by the sliding-action actuating portion and the skirt portion relates to the longitudinal cross-section of the sliding part. In specific terms, this means that the sliding part is approximately L-shaped in longitudinal cross-section, the L-leg forming the sliding-action actuating portion and the L-crosspiece forming the skirt portion. It is preferably provided that the enclosing angle lies within a range of between 90° and 100°. As a measure to prevent slipping, it is proposed that the sliding-action actuating portion may have on the upper side, for the actuating finger, a raised profiling which forms an actuating zone. The profiling may also be formed such that it gives a visual indication to the user, for example by arrows or the like, regarding the functioning of the dispenser or of the sliding-action actuating portion. It is also advantageous if the sliding part forms the skirt portion beneath the delivery opening, the slightly concave outer wall of the skirt portion making it easier for the strand of substance which is forced out of the delivery opening to be removed. The fact that the sliding-action actuating portion extends such that it engages over a center of the dispenser proves to be advantageous for operation. This provides for comfortable operation of the actuating portion, for example, for the actuating finger. According to the invention, it is further provided that the sliding part has one or two flank portions which run at an angle both to the skirt portion and to the sliding-action actuating portion. The sliding part preferably has two flank portions disposed congruently in relation to one another. As a result, the sliding part has an approximately U-shaped cross-section, the flank portions being formed by the U-legs in each case. Such an arrangement means that the sliding part is formed approximately in the manner of a helmet, the outwardly oriented skirt portion being formed, in principle, by the helmet visor. The sliding part is positioned preferably in a straddling position on the delivery head. In this respect, it is proposed that the sliding part has mutually facing guide rails which are disposed on the inner walls of the flank portions in each case and for their part, in order to guide the sliding part, interact with accommodating means formed from the delivery head. The captive state of the sliding part is achieved in that the accommodating means each have blocking portions which, in the open position of the sliding part, interact with corresponding mating blocking portions of the guide rails. The sliding part may be biased into its closed position. Following an actuation, it can thus move back automatically into its closed position. In a variant, it is also possible for the displacement part to be displaced into the open position only on account of a threshold pressure value being exceeded, for example by way of a correspondingly biased spring, this then also taking place automatically solely as a result of the pressure produced in the dispenser, without any need for a dedicated and deliberate displacement movement. In order to achieve optimum interaction between the closure pin and the delivery opening of the sliding part when the sliding part is actuated, it is provided, according to the invention, that the closure pin extends substantially axially and centrally into the delivery channel of the delivery head, the delivery channel enclosing both the delivery-channel portion of the sliding part and the closure pin. The delivery channel, which is formed from the delivery head, extends, in turn, within a tube portion which is integrally formed in the top of the delivery head, to which tube portion, at the same time, the closure pin is also attached.

BRIEF DESCRIPTION OF THE DRAWINGS

The invention is explained further hereinbelow with reference to the accompanying drawing, although the latter represents merely one exemplary embodiment. In the drawing.

DETAILED DESCRIPTION OF THE INVENTION

Figure 1:
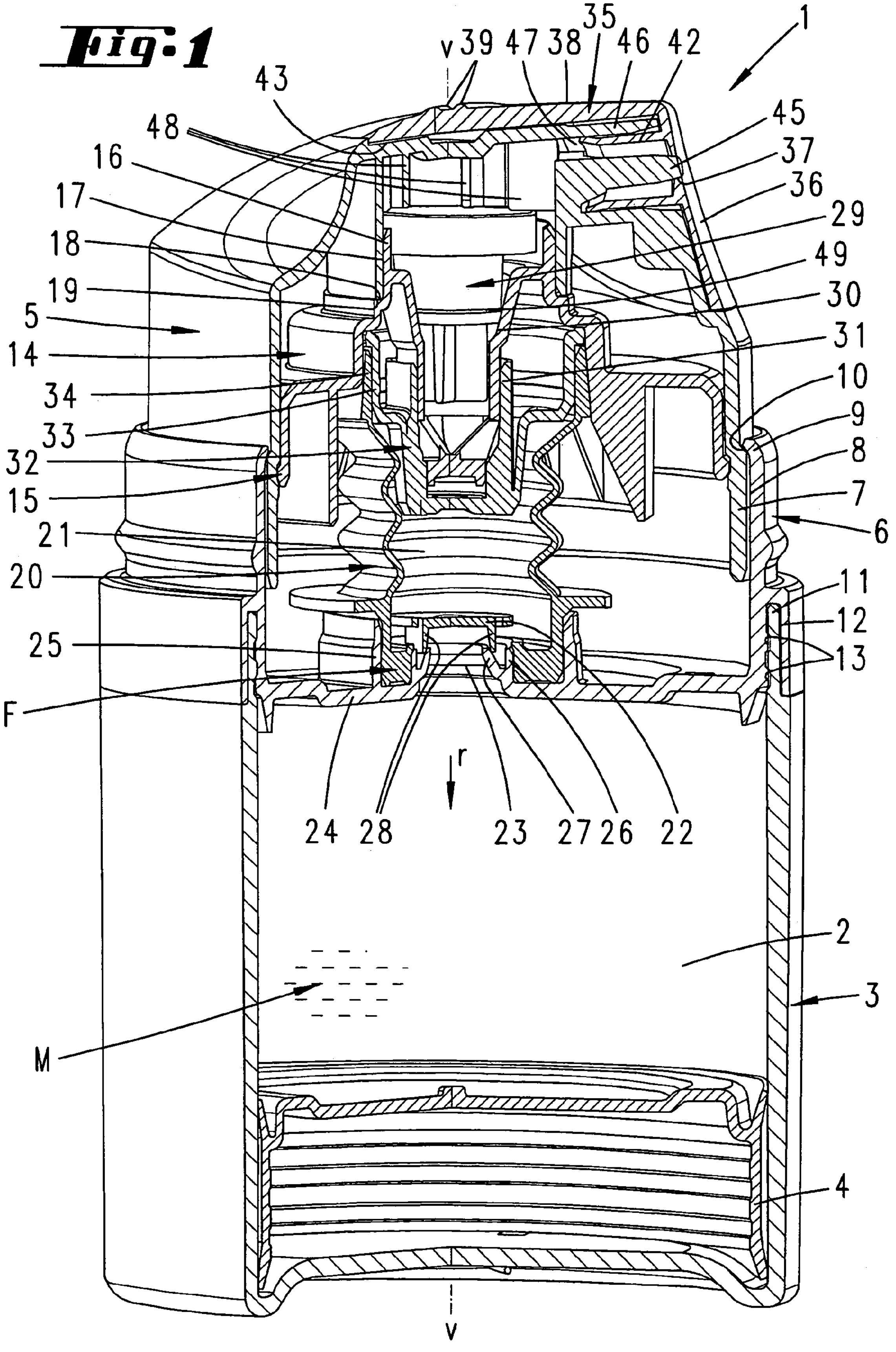
FIG. 1 shows a partially cut-away illustration of the dispenser with the sliding part in the closed position, a closure cap not being illustrated.
Figure 2:
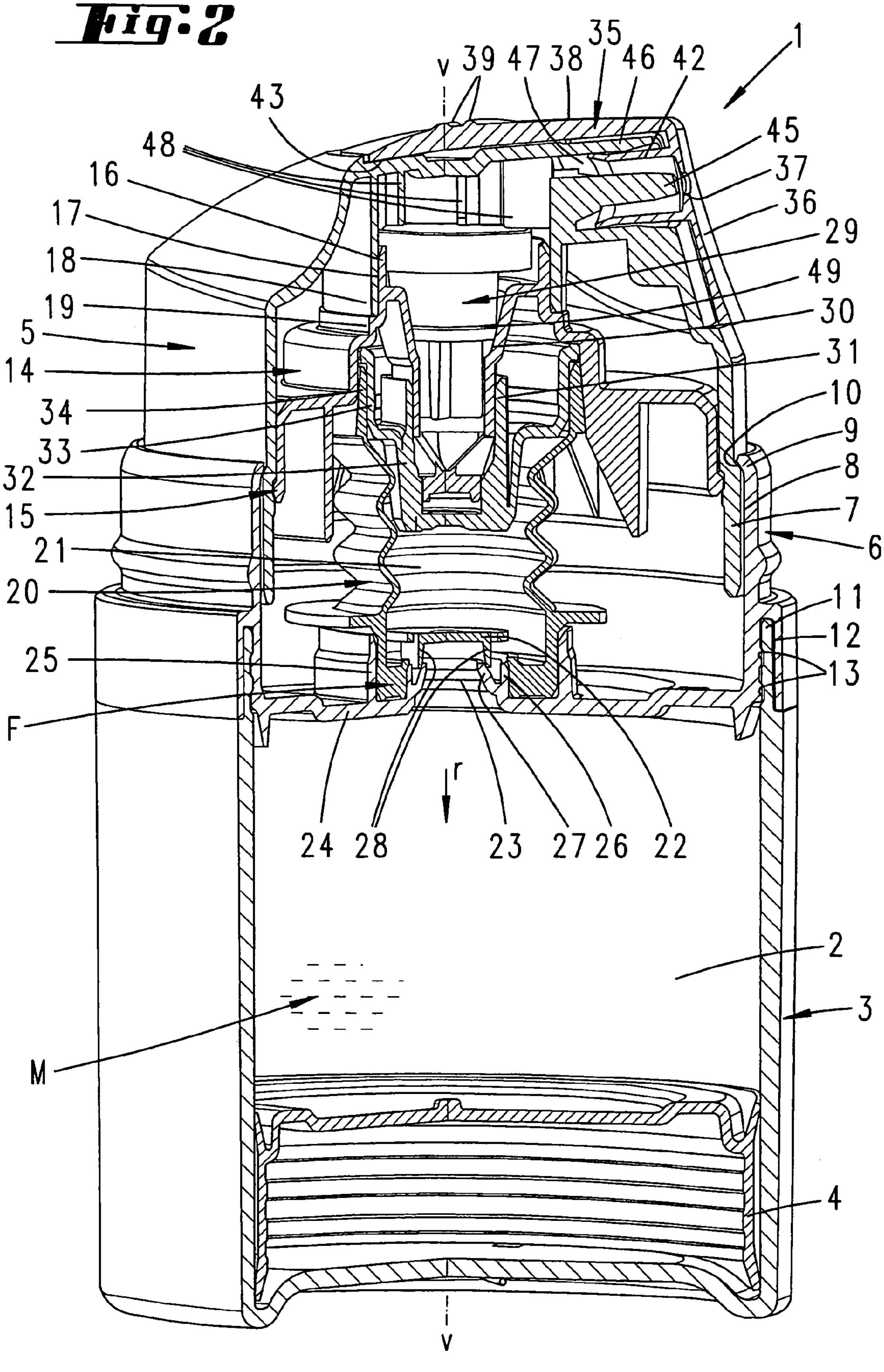
FIG. 2 shows an illustration according to FIG. 1 with the sliding part in the open position.

Illustrated and described, in first instance with reference to FIGS. 1 and 2, is a dispenser 1 for delivering a pasty substance, such as for example a skin cream or the like.

The dispenser 1, which is approximately cylindrical and has a round cross-section, has a storage container 3 which forms a storage space 2. In the storage space 2, there is disposed a follow-on plunger 4 which is positioned centrally about a dispenser axis v. The follow-on plunger 4, which slides along on the inner lateral surface of the storage space 2 in a sealing manner during pumping actuation interacts in a conventional manner with the substance M stored in the storage space 2. The dispenser 1 also has a delivery head 5 which, at the same time, also forms a pump head and, for its part, is disposed in a telescopic manner on the dispenser 1 for the purposes of removing the substance M which is to be dispensed.

In this respect, it is provided that the delivery head 5 interacts telescopically with an adapter part 6 which is fixed on the neck of the storage container 3. For this purpose, it is provided that, at its lower region, the delivery head 5 has a wall portion 7 which is of increased diameter in the circumferential direction, is of step-like formation in cross-section and, for its part, is guided by the inner wall of a cavity 8 of the adapter part 6, which is formed in a pot-like manner, during pumping actuation of the delivery head 5. In this case, as can be gathered from the illustrations, the diameter of the cavity 8 is dimensioned to be somewhat larger than the diameter of the wall portion 7 of the delivery head 5. In order to secure the delivery head 5 axially in the cavity 8 of the adapter part 6, it is provided that the opening periphery 9 of the cavity 8 tapers in the inward direction of the cavity and interacts in a blocking manner with a step 10 of the wall portion 7.

The connection between the storage container 3 and the adapter part 6 takes place via a latching or clamping fit. In respect of this, it is proposed that the neck of the storage container 3 is of reduced diameter in the circumferential direction, with a latching wall 11 being formed. The adapter part 6 is plugged with latching action on this latching wall 11 via an annular groove 12 formed from the adapter part 6. For this purpose, the annular groove 12 has latching beads 13 which project into the interior of the groove in the circumferential direction and, correspondingly, interact with the latching wall 11.

As can be seen in further detail, the delivery head 5 encloses a transition part 14 which is fixed in the delivery head 5 and is disposed centrally about the dispenser axis v, the securing between the delivery head 5 and the transition part 14 being effected by means of a latching connection 15. The neck 16 of the transition part 14, this neck being of step-like formation, projects into an accommodating opening 17 of circular form, which is disposed in the upper region of the delivery head 5 and, for its part, interacts in a sealing manner, by way of its inner wall, with the outer wall of the neck 16. The peripheral end surface 18 of the accommodating opening 17 is supported in a face-to-face manner on a correspondingly adapted step 19, at which the neck 16 is rooted. As a result of this and of the latching connection 15, the transition part 14 is arrested within the delivery head 5 about the dispenser axis v, so that, accordingly, the transition part 14 follows along through the pumping actuation of the delivery head 5 and the axial displacement of the delivery head 5 resulting from this.

Furthermore, a pump bellows 20 which interacts with the transition part 14, and is positioned centrally about the dispenser axis v, is disposed within the delivery head 5. When the delivery head 5 is actuated in the pumping direction r, the pump bellows 20 is compressed in conventional manner to store energy and thus also provides the necessary restoring force for the delivery head 5.

In further detail, the flexible pump bellows 20 has a pumping chamber 21. The pump bellows 20 is formed to extend in a zigzag manner in vertical cross-section although, as would appear from a horizontal cross-section, it is basically of circular form. The pump bellows is here preferably a plastic injection molding made of a correspondingly flexible plastics material. Within the pumping chamber 21, the pump bellows 20 has, at the foot end, an integral and centrally disposed inlet valve 22, of which the interacting part, which is disposed axially beneath the inlet valve and forms an inlet opening 23, is formed by a base 24 of the adapter part 6. In addition, the base 24 also forms the top of the storage space 2.

In further detail, the adapter part 6 forms a supporting pedestal 25 which projects from the base 24 and in which the underside of the foot region F of the pump bellows 20 is seated, to be precise in cooperation with the inner wall of the round supporting pedestal 25. In this region, it is also the case that the pump bellows 20 is no longer of bellows-like formation; rather, it has a solid wall which, in the region over which the supporting pedestal 25 engages, has a thickened triangular cross-section.

Enclosed by the supporting pedestal 25, the pump bellows 20, or the foot region F thereof, is seated on the base 24. In this case, both the foot region F and the inlet valve 22 of the pump bellows 20 are disposed concentrically about the inlet opening 23 of the base 24. On its mouth-opening side, the inlet opening 23 terminates in two concentric rings 26 and 27. The outer surface of the ring 27 interacts in a sealing manner with a concentric lip 28 of the inlet valve 22.

Located at the top of the delivery head 5 is an outlet valve 29 which is disposed concentrically about the dispenser axis v and is in the form of a flexible plastics part. The outlet valve 29 is seated in an axially running funnel-like channel 30 of the transition part 14. Via the cylindrical outer wall of the channel 30, the transition part 14 is fixed in a round and concentrically disposed securing portion 31 of a second adapter part 32. The adapter part 32 interacts with the transition part 14 via an enlarged-diameter collar 33, which encloses the securing portion 31, such that the pump bellows 20 is fixed between the collar 33 and a corresponding supporting surface of the transition part 14 by being clamped in via an upper collar 34.

The adapter part 32, which projects axially, in part, in the pumping chamber 21, and the channel 30 of the transition part 14 each have axially directed through-openings (not described any more specifically) for the substance M which is to be dispensed.

Figure 14:
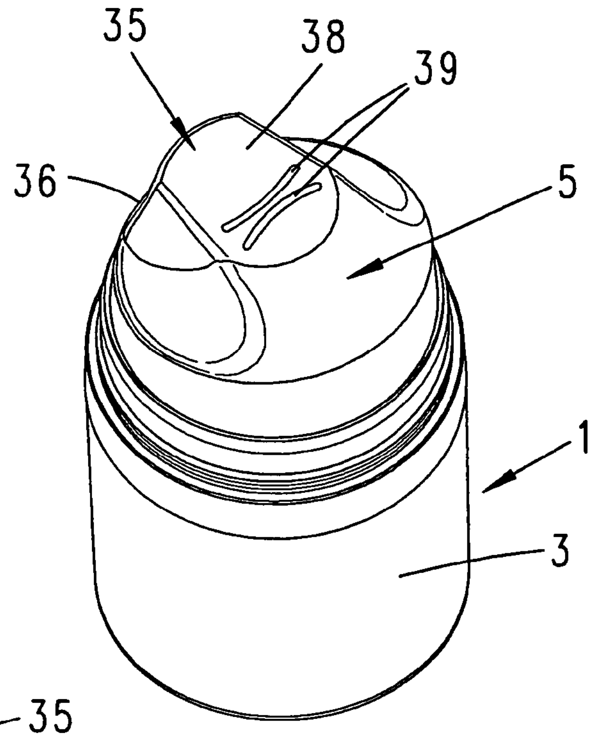
FIG. 14 shows a perspective view of the outside of the dispenser as a whole, without a closure cap.
Figure 15:
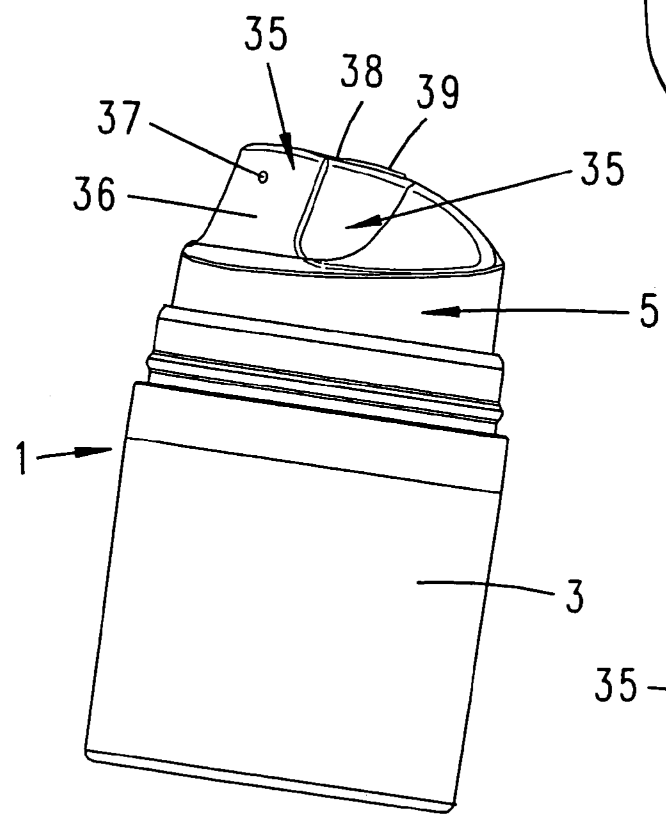
FIG. 15 shows an illustration according to FIG. 14, in side view.
Figure 16:
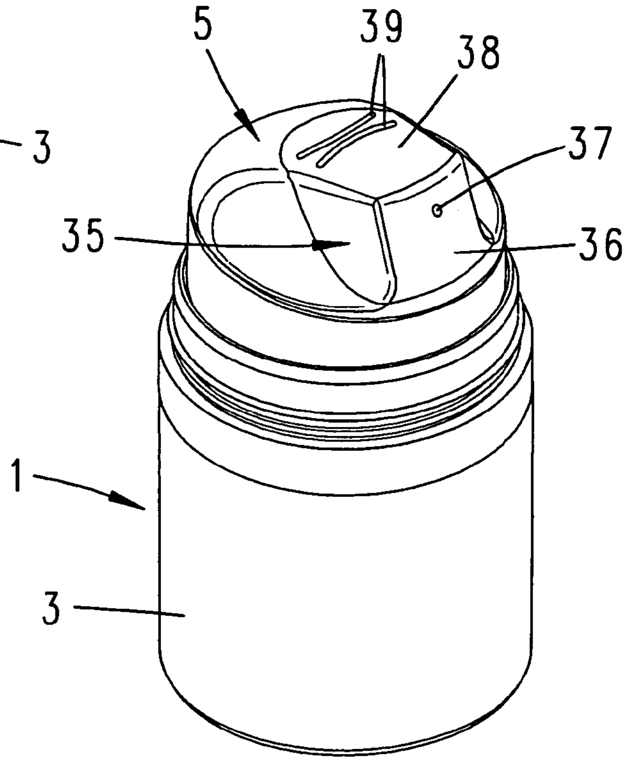
FIG. 16 shows an illustration according to FIG. 14, in an oblique view from the front.

As can further be gathered from the illustrations, a linearly displaceable sliding part 35 which is oriented transversely to the dispenser axis v is associated with the upper side of the delivery head 5. The three-dimensional configuration of the sliding part 35 is such that, in the non-actuated position, the sliding part 35 is adapted substantially to the outer geometry of the delivery head 5 (see, in particular, FIGS. 14-16).

Figure 10:
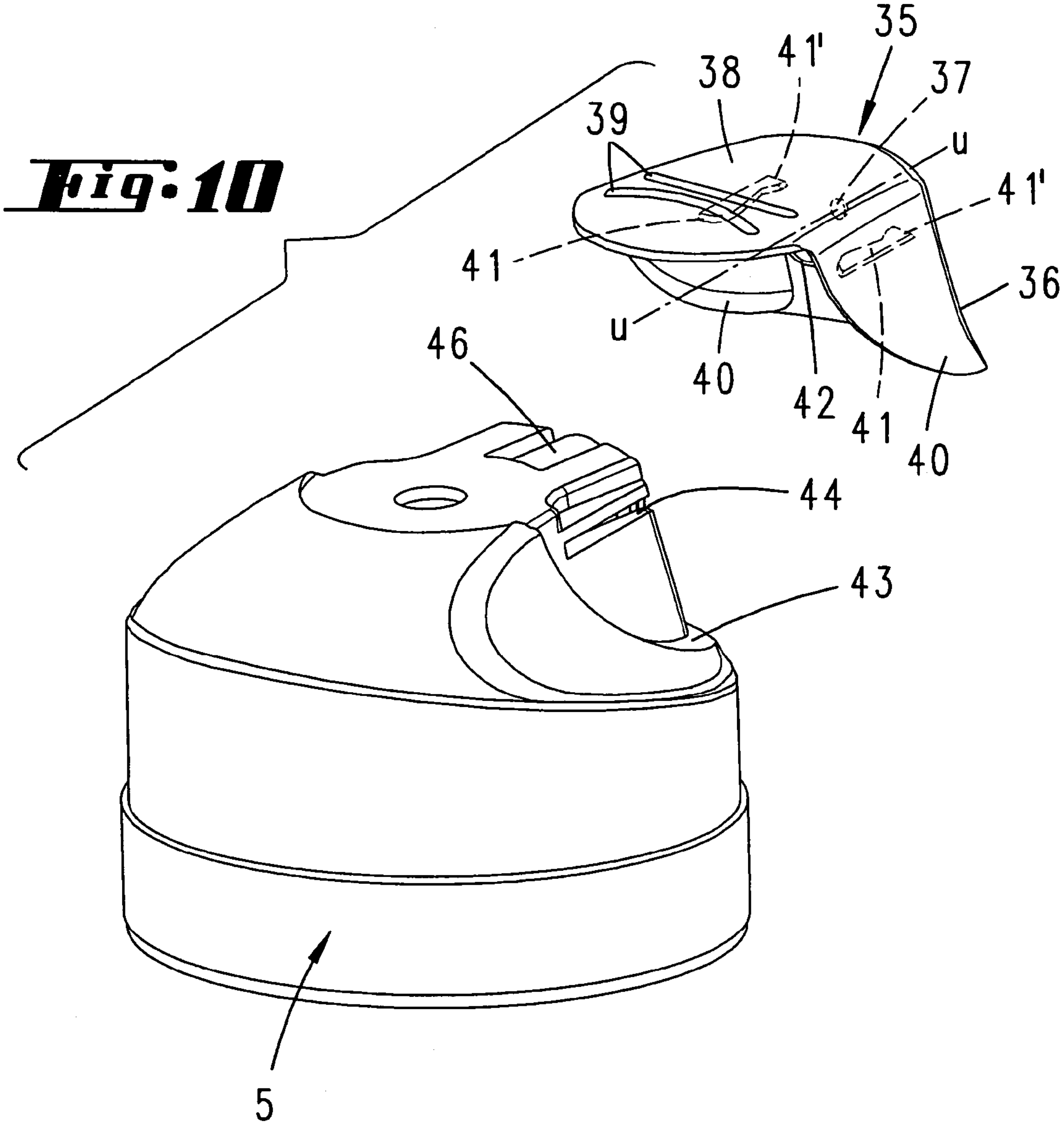
FIG. 10 shows in perspective view, the way in which the sliding part and the delivery head are associated with one another.
Figure 11:
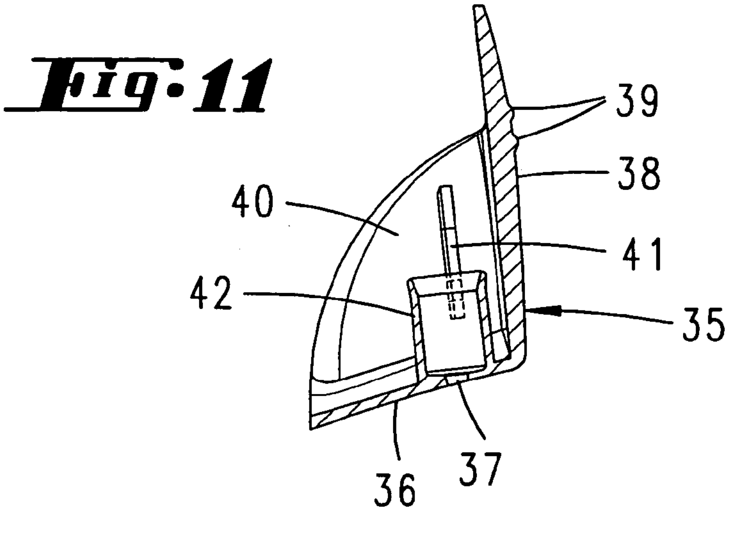
FIG. 11 shows a cross-section through the subject matter according to FIG. 8, the cross-section being taken along line XI-XI.
Figure 12:
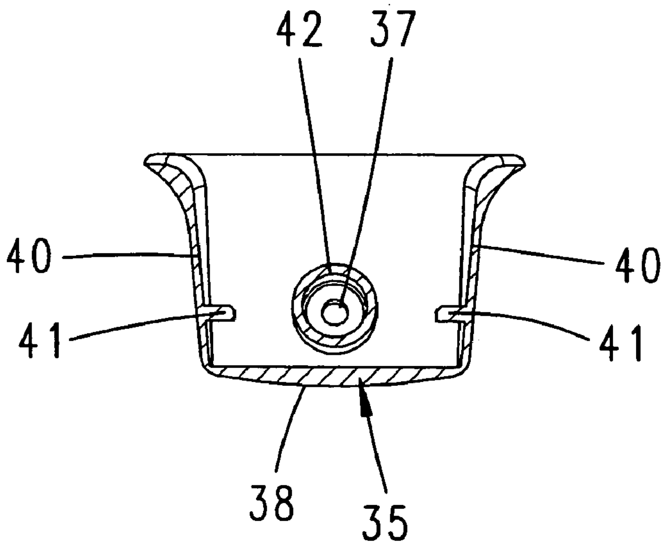
FIG. 12 shows a cross-section through the subject matter according to FIG. 8, the cross-section being taken along line XII-XII.
Figure 13:
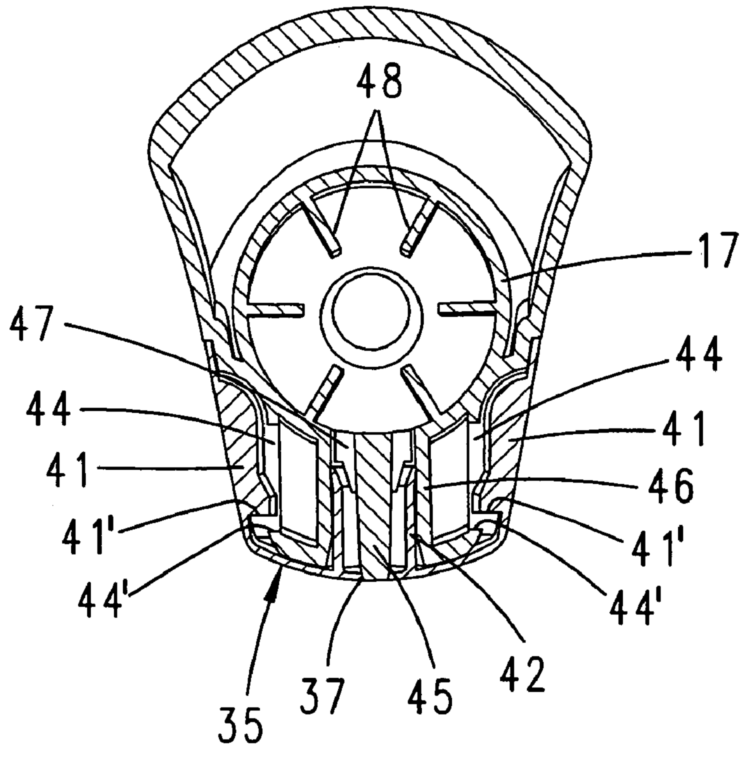
FIG. 13 shows a cross-section through the subject matter according to FIG. 3, the cross-section being taken along line XIII-XIII.

As can be seen in FIG. 10, it is provided, according to the invention, that the sliding part 35 is formed approximately in the manner of a helmet, the theoretically fixed helmet visor functioning as an outwardly oriented skirt portion 36. Above this skirt portion 36, the sliding part 35 has a delivery opening 37 which is disposed about a transverse axis u, and preferably has a round cross-section. While the cross-section of the sliding part 35 as a whole is approximately U-shaped, the longitudinal cross-section of the sliding part 35, in contrast, is L-shaped, both the skirt portion 36 and the delivery opening 37 being formed by the L-crosspiece. The elongate L-leg forms an outer-surface sliding-action actuating portion 38 for the sliding part 35 as a whole. In order to facilitate the operation of the sliding-action actuating portion 38, for example, using an actuating finger, it is proposed that the sliding-action actuating portion 38 has a profiling 39 oriented transversely to the displacement direction of the sliding part 35. This profiling may be formed, as is illustrated, from separate ribs or, as an alternative, in a round or elliptical manner. As has already been mentioned above, the sliding part 35 has a U-shaped cross-section. The U-legs are formed by two flank portions 40 which are directed toward one another and project at an angle from the actuating portion 38. The flank portions 40, which enclose an angle in each case with the rear of the skirt portion 36 and with the base of the sliding-action actuating portion 38, have guide rails 41 disposed congruently opposite one another on their inner walls in each case. These guide rails 41 flank or enclose, on both sides, a delivery-channel portion 42 of the sliding part 35, this channel portion being disposed about the transverse axis u and being formed on the rear of the skirt portion 36. The delivery opening 37, which is formed above the skirt portion 36, opens out centrally in this delivery-channel portion 42. The inwardly directed longitudinal orientation of the delivery-channel portion 42 runs parallel to the longitudinal orientation of the sliding-action actuating portion 38. By means of the guide rails 41, the sliding part 35 can be positioned in a straddling manner, for linear displacement, on the delivery head 5. In this respect, the approximately step-like positioning region 43 of the delivery head 5 is adapted correspondingly to the wall thickness of the sliding part 35. With the sliding part 35 being positioned in a straddling manner, the guide rails 41 thereof each engage in accommodating means 44 which are formed in an equivalent manner from the delivery head 5 and are respectively disposed on both sides of the transverse axis u. The accommodating means 44 are formed such that they extend in the delivery head 5 from the outside. They may open in the inward direction, but may also be closed in the inward direction. They are preferably closed in the inward direction. In order to fix the sliding part 35 in captive fashion on the delivery head 5, it is proposed that the accommodating means 44 each have pullout-blocking stops 44' which, for their part, when the sliding part 35 is in the fully open position, interact with correspondingly adapted stop surfaces 41' of the guide rails 41.

Figure 3:
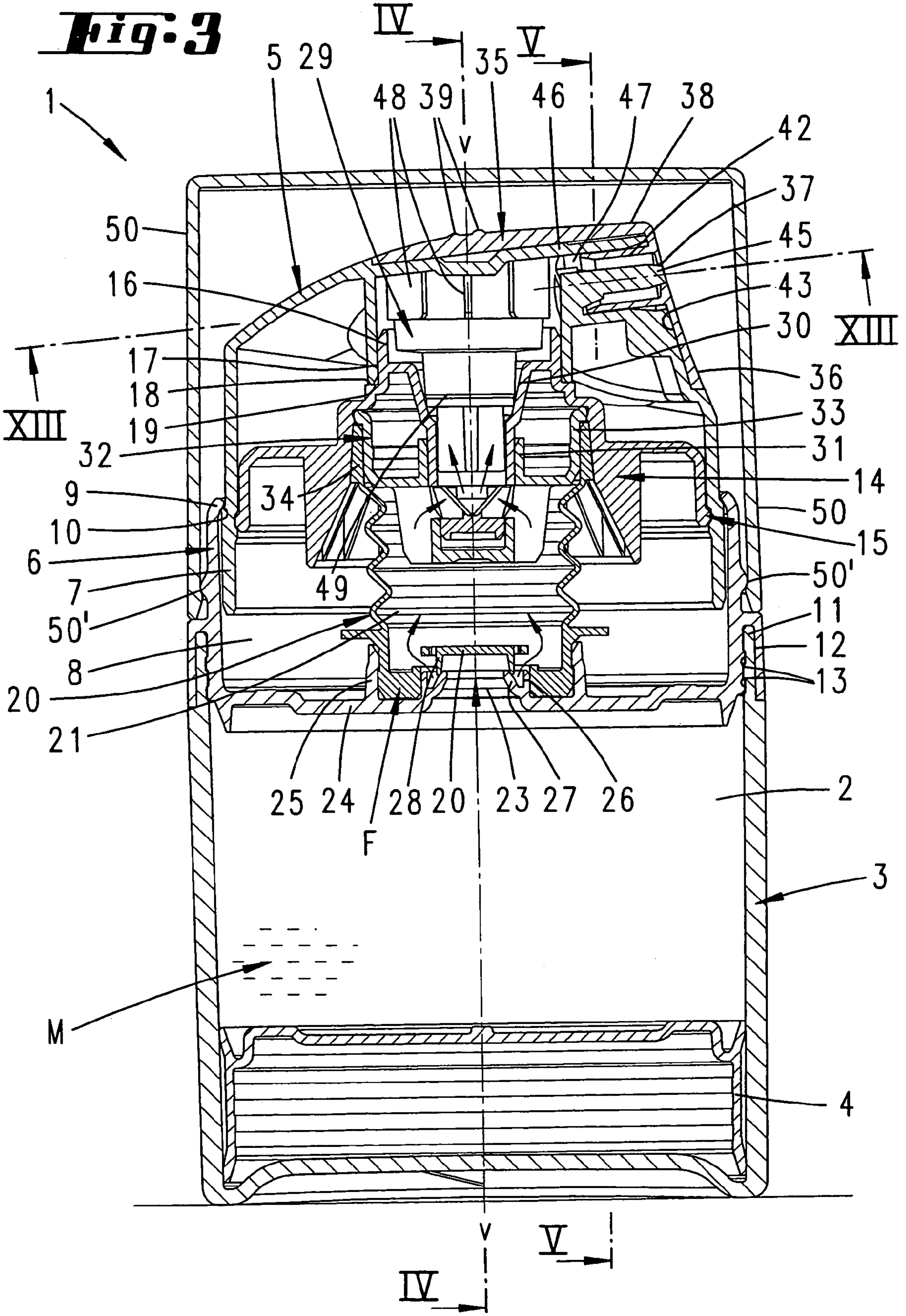
FIG. 3 shows a technical illustration corresponding to FIG. 1 with the closure cap illustrated.
Figure 4:
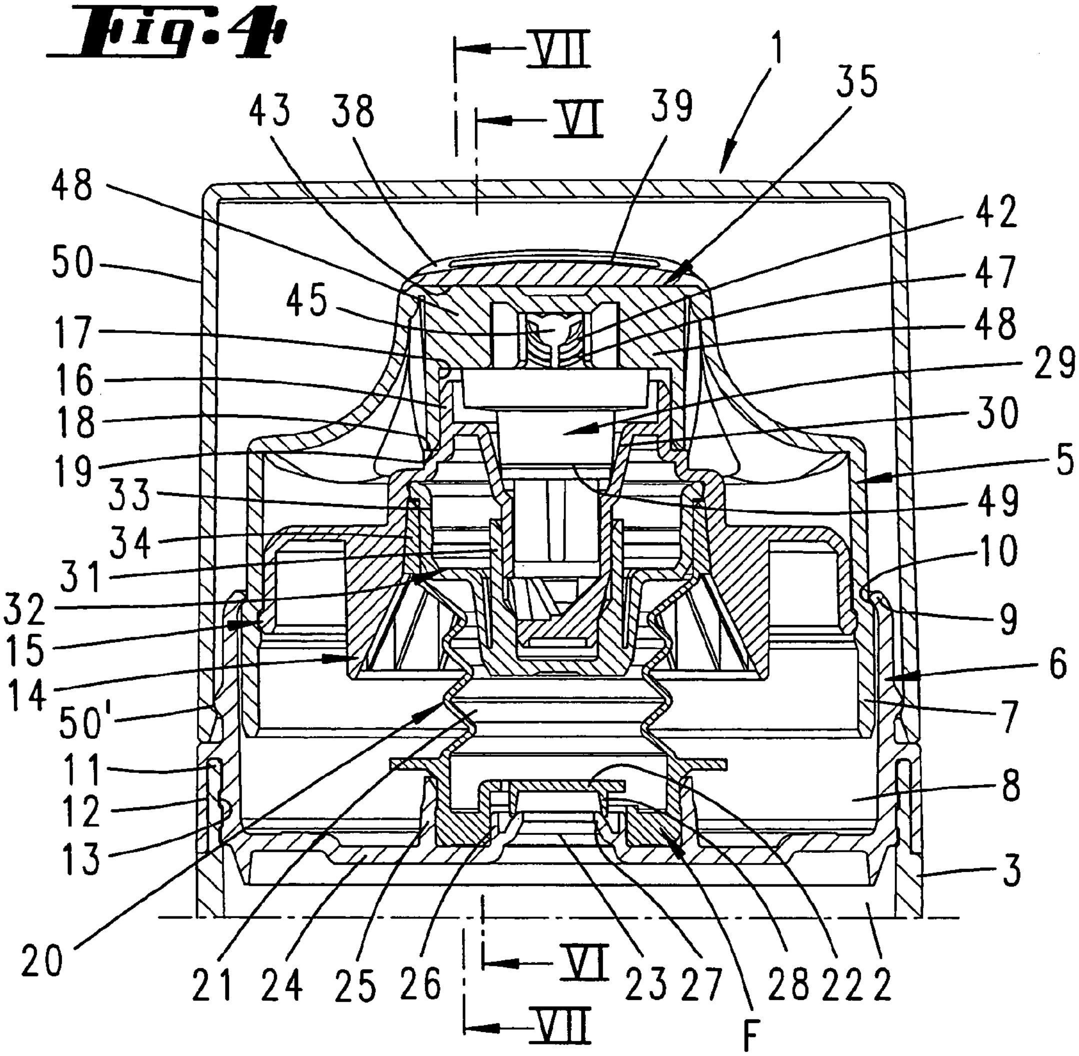
FIG. 4 shows a cross-section through the subject matter according to FIG. 3, the cross-section being taken along line IV-IV.
Figure 5:
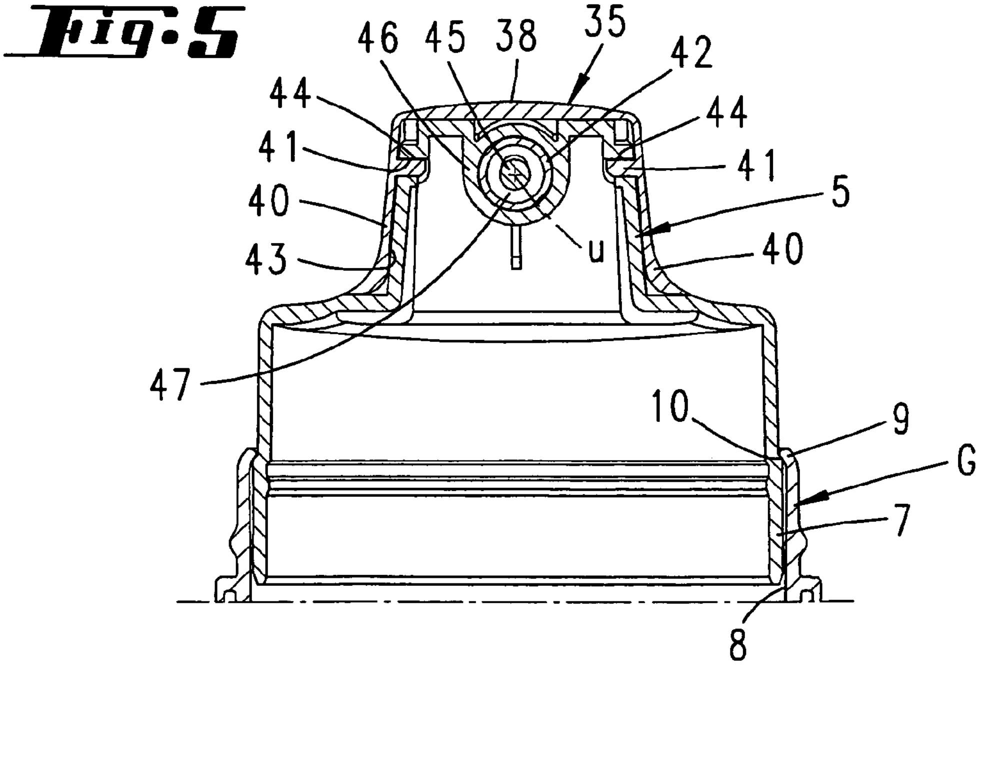
FIG. 5 shows a cross-section through the delivery head, along line V-V according to FIG. 3, offset in the direction of the delivery opening in relation to the cross-section according to FIG. 4, the closure cap not being illustrated.
Figure 6:
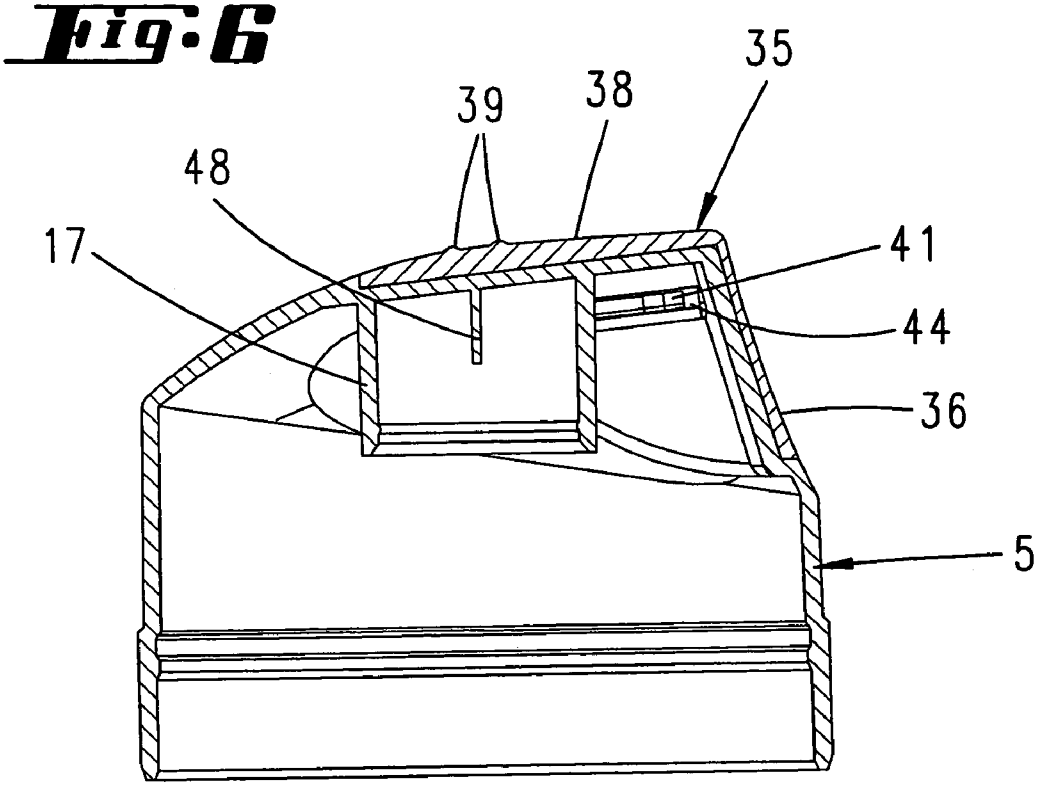
FIG. 6 shows an off-center vertical section through the delivery head in the closed state of the slide part, along line VI-VI in FIG. 4.
Figure 7:
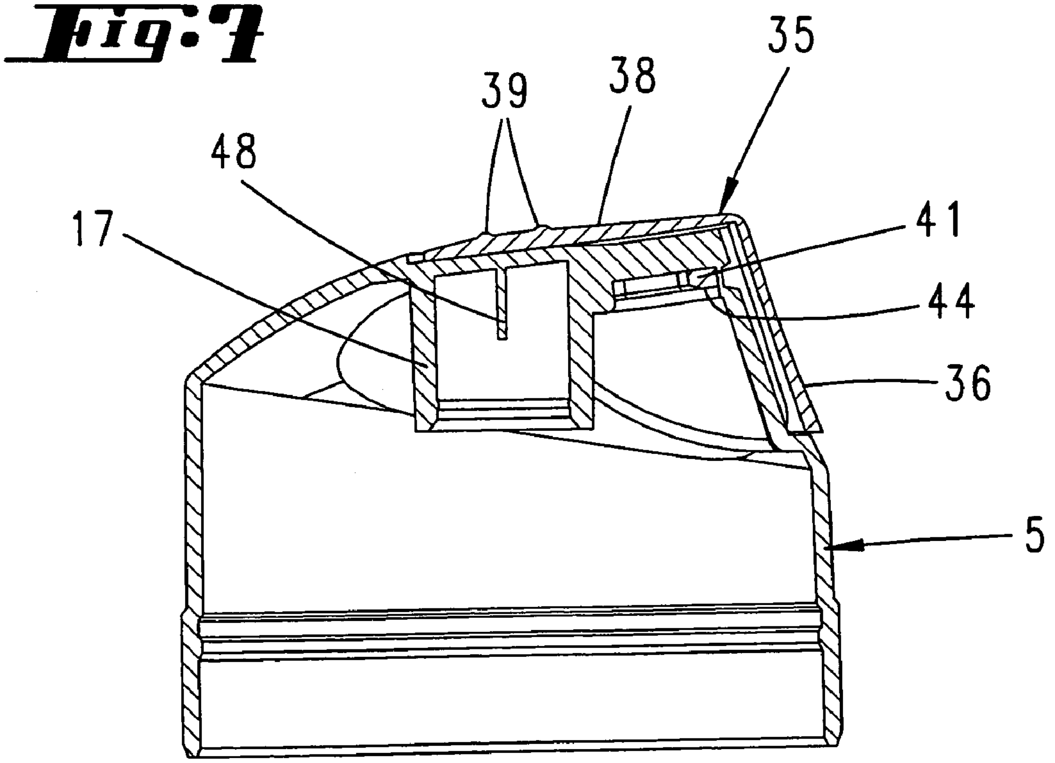
FIG. 7 shows an illustration corresponding to FIG. 6, but in a slightly displaced section plane, in the open state of the slide part, along line VII-VII in FIG. 4.
Figure 8:
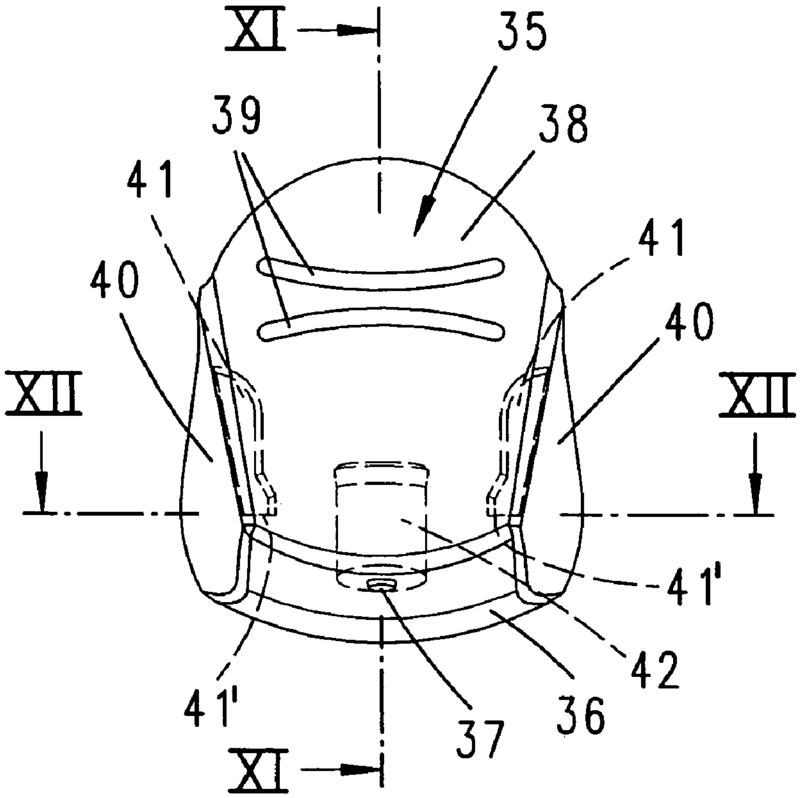
FIG. 8 shows the slide part in a view from above.
Figure 9:
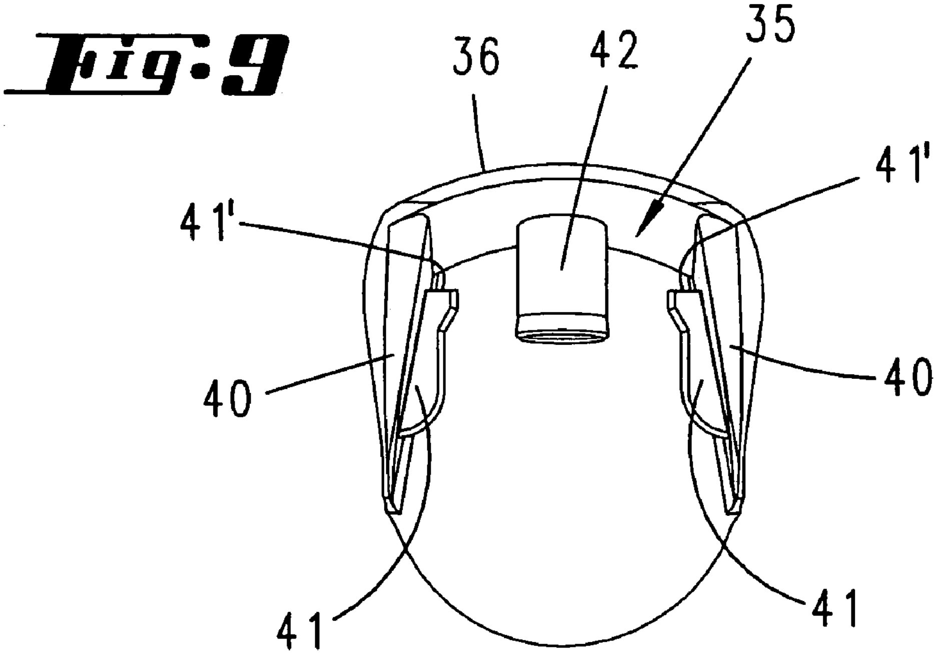
FIG. 9 shows the slide part in a view from beneath.

In further detail, it can be seen from FIGS. 1-3 that the sliding part 35, which is seated on the delivery head 5, interacts with a closure pin 45 which is positioned in the upper region of the delivery head and is disposed integrally in the delivery head. The closure pin 45, which is disposed axially about the transverse axis u, extends within a tube portion 46 which is integrally formed in the top of the delivery head 5 and, for its part, forms the necessary delivery channel 47 in the delivery head 5. On the inside, the delivery channel 47 opens out into the accommodating opening 17, which is disposed concentrically about the dispenser axis v and in which the neck 16 of the transition part 14 is also arrested. Starting from the top of the accommodating opening 17, ribs 48 project into the accommodating opening 17, the ribs 48 being positioned concentrically about the dispenser axis v and, in addition, being distributed uniformly in the circumferential direction of the accommodating cavity 17.

As is illustrated, the delivery-channel portion 42 is positioned for guidance in the delivery channel 47 of the delivery head 5, the delivery channel being formed by the tube portion 46. In the closed state of the sliding part 35, the tapering, free end of the closure pin 45, which is directed away from the dispenser, enters in a sealing manner into the delivery opening 37 of the sliding part 35 from the rear. The longitudinal cross-section of the delivery opening 37 here is adapted to the tapering, free end of the closure pin.

When the delivery head 5 is moved back, following a pumping actuation, into the starting position, as is illustrated, for example, in FIGS. 1 and 3, the substance M flows out of the storage space 2 into the pumping chamber 21 as illustrated by the arrows. Furthermore, both the adapter part 6 and the adapter part 32 have formed in them, also corresponding to the arrows depicted, opening paths which allow the substance M to flow to the outlet valve 29 upon actuation. The outlet valve 29, which is formed as a flexible valve overall, seals against an annular periphery 49, which rises up in the direction r upon corresponding pressure actuation, while it is supported on the upper side by the ribs 48, which are formed on the inside in the delivery head 5 and/or the accommodating opening 17.

For removal of the substance M, the sliding part 35 can be displaced linearly into the open position, coaxially in relation to the transverse axis u, in the direction away from the dispenser, by means of an actuating finger. In this case, the substance M flows through the axially oriented channel 30 and the delivery channel 47 of the delivery head 5, this delivery channel being positioned transversely to the channel 30, and slides around the closure pin 45 in the direction of the delivery opening 37, in order then to pass out of the latter in a strand-like manner.

Following removal of the substance M, the sliding part 35 can be displaced, in a linear reverse sequence, in the direction of the dispenser in order that the closure pin 45 moves into the delivery opening 37 again in a sealing manner.

In order to protect the delivery head 5, it is provided that the delivery head 5 has an over-cap 50 engaging over it, this over-cap, for its part, being secured on the dispenser 1 via a latching connection 50'.

What is claimed is:

1. Dispenser for delivering portions of liquid to pasty substances, having a storage container and a pumping chamber, the pumping chamber having at least one valve, and having a delivery head which can be displaced relative to the storage container and the displacement of which allows the substance to be delivered, the delivery head further having formed in it a delivery channel with a delivery opening, which delivery opening can be closed by a closure part which is removable, but is held in captive fashion on the delivery head, characterized in that the closure part is a sliding part which also forms a delivery-channel portion and interacts with a fixed closure pin and has a sliding-action actuating portion, characterized in that the sliding part is seated on the delivery head such that it is accessible for an actuating finger.

2. Dispenser according to claim 1, characterized in that the sliding part can be actuated from the upper side of the delivery head.

3. Dispenser according to claim 1, characterized in that the sliding part has an upper-side sliding-action actuating portion which, in cross-section, extends at an angle to a skirt portion such that the inner surface of the skirt portion encloses an angle of less than 180° in relation to the sliding-action actuating portion.

4. Dispenser according to claim 1, characterized in that the sliding part forms the skirt portion within the delivery opening.

5. Dispenser according to claim 1, characterized in that the sliding-action actuating portion extends such that it engages over a center.

6. Dispenser according to claim 1, characterized in that the sliding part has one or two flank portions which run at an angle both to the skirt portion and to the sliding-action actuating portion.

7. Dispenser according to claim 1, characterized in that the sliding part has guide rails which are disposed on the flank portions and, in order to guide the sliding part, interact with accommodating means of the delivery head.

8. Dispenser according to claim 1, characterized in that the sliding part is biased into its closed position.

9. Dispenser according to claim 1, characterized in that the closure pin extends substantially axially and centrally into the delivery channel.

10. Dispenser according to claim 1, characterized in that the delivery channel extends within a tube portion integrally formed in the top of the delivery head.

11. Dispenser according to claim 1, characterized in that the closure pin is attached to the tube portion.

* * * * *